May 25, 1948.  J. C. AUTEN  2,442,159

TRANSMISSION CONTROL MECHANISM

Filed April 4, 1945  4 Sheets-Sheet 1

INVENTOR.
Jay C. Auten.
BY
Harness & Harris
ATTORNEYS.

Patented May 25, 1948

2,442,159

UNITED STATES PATENT OFFICE 2,442,159

TRANSMISSION CONTROL MECHANISM

Jay C. Auten, Royal Oak, Mich., assignor to Chrysler Corporation, Highland Park, Mich., a corporation of Delaware Application April 4, 1945, Serial No. 586,498

17 Claims. (Cl. 74—484)

This invention relates to transmission control mechanism and refers more particularly to improvements in transmission remote shift mechanism especially adapted for mounting on motor vehicle steering posts.

It is an object of my invention to provide a control mechanism capable of being manufactured at lower cost than devices of this general type heretofore known.

Another object is to provide a control which is less likely to rattle than known devices and which will give better service and have longer life, also a control mechanism having improved characteristics of thrust application from the hand lever to the main steering post mounted selector operating control rod.

A further object is to provide an improved arrangement for biasing the hand lever in a direction serving to offset the effect of gravity acting on the hand lever and tending to unintentionally shift the hand lever out of certain of its positions of shift, such tendency being aggravated by the vibration or jiggle of the vehicle as it is being driven along a rough roadway. I have also arranged my improved biasing means to yieldingly urge the control mechanism toward one of the paths of H-shift such as what is commonly termed the high speed side as distinct from the side for selecting reverse. An important characteristic of my biasing means resides in an arrangement which will avoid spring failures experienced in the past due, for example, to tendency of the spring to wrap around the main operating shaft.

Another object is to provide a biasing means for the main control rod so arranged as to yieldingly maintain the shift lever against accidental and undesired displacement from each of its positions of shift forwardly and rearwardly from the neutral gate. My arrangement, according to one embodiment of my invention, is such that the biasing means does not operate to yieldingly urge shift of the lever toward neutral from a position of shift either forwardly or rearwardly from neutral in the general H-path of lever shift.

Further objects and advantages of my invention reside in the combination and arrangement of parts hereinafter described and claimed, reference being had to the accompanying drawings in which:

Fig. 9A is an elevational view of a modified type of fulcrum bushing for a shift lever of slightly modified form.

Fig. 16 is a view generally similar to Fig. 8 but illustrating a modified arrangement of biasing means.

In the drawings I have illustrated by invention in connection with a motor vehicle comprising the well known engine A, clutch B, and any type of transmission C which is adapted to be manipulated at least in part by the vehicle driver. In general, my invention provides improvements in the transmission control mechanisms illustrated in the patents to F. W. Slack No. 2,291,111, of July 28, 1942, and O. E. Fishburn No. 2,284,191, of May 26, 1942, and may be employed to advantage in controlling the shift functions of various types of transmissions other than those illustrated in these patents.

My control mechanism is especially adapted for mounting on the conventional steering post 15 below the steering wheel 16, this steering post having its axis inclined forwardly and downwardly from the steering wheel. A main control rod D extends longitudinally adjacent the post 15 and is adapted to select and operate the transmission control elements for forward and reverse speed ratio drives as in the transmissions of the aforesaid patents, for example. When rod D is adjusted from a neutral position in the direction of its axis, such motion is transmitted through any suitable operating connection, such as through the Bowden wire 17, to the transmission selector lever 18. When rod D is rotated about its axis such motion is transmitted through any suitable operating connection, such as through the link and lever system 19, 20, 21, to the transmission lever 22 thereby to operate the transmission speed ratio control element which has been selected by longitudinal movement of rod D.

Figures 3, 4, 5:
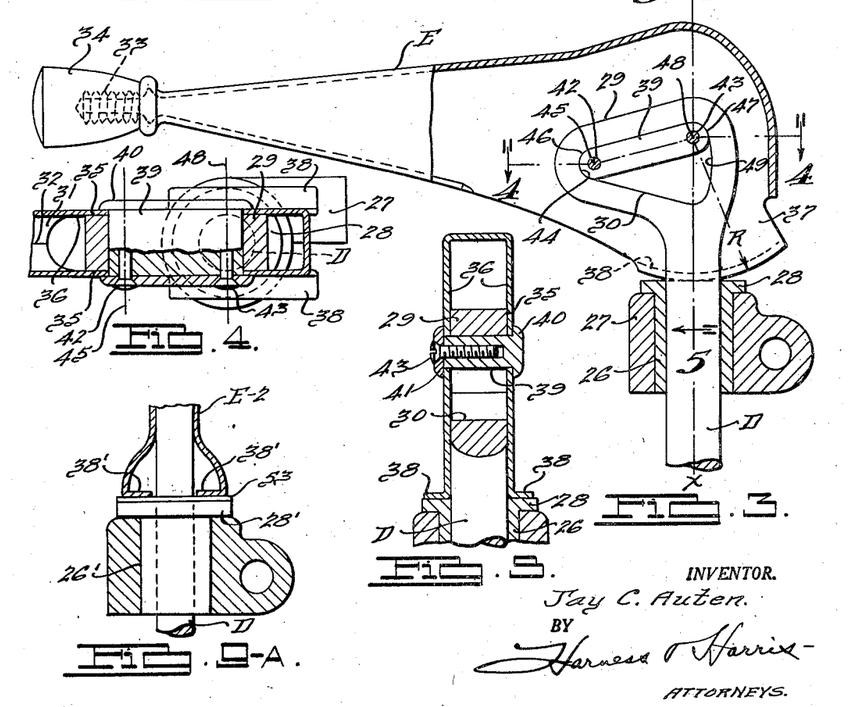
Fig. 3 is a sectional elevational view through the shift lever and connection to the steering post mounted control rod.
Fig. 4 is a detail sectional plan view taken as indicated by line 4—4 of Fig. 3.
Fig. 5 is a sectional elevational view taken as indicated by line 5—5 of Fig. 3.

Rod D may be suitably guided adjacent its lower end to accommodate its rotary and longitudinal movements as in the yielding bushing 23 (Fig. 8) carried by bracket 24 rigidly mounted on post 15. Rod D may be assembled downwardly in its bushing mountings, a lever 25 being thereafter fixed to the rod for operating link 19. Adjacent its upper end rod D is guided by a bushing 26 which is fixed in a bracket 27 which in turn is fixed to post 15. In Fig. 3 the bushing 26 has a press fit in bracket 27, this bushing having an annular flange 28 at its upper end resting on the upper face of the bracket. As will presently be apparent, the bushing 26 serves as a fixed fulcrum support for the shift lever on the post 15.

At its upper end rod D is formed with a flattened laterally elongated lever-forming head portion 29 slotted at 30 to receive a lever operating and guide means. A shift lever E comprises a hollow steel stamping having its bottom terminal flanges 31 brought together at 32 (Fig. 7) and terminating outwardly in a stem portion 33 threaded to receive the handle or knob 34 adapted to be grasped by the driver in manipulating lever E. If desired, the outer end of shift lever E may be formed as an integral part of the lever instead of as a separate part connected thereto. At its inner end, the walls of lever E form a housing for the rod head 29, the sides 35 of the latter slidably engaging the inner side faces of the lever side walls 36 of lever E thereby maintaining the lever against lateral displacement relative to rod D. This housing portion of lever E opens downwardly at 37 above bushing 26 and for providing a slidable fulcrum mounting of lever E on bushing 26, lever fulcruming rockers are carried by the lever. In the Fig. 3 embodiment of my invention these rockers or cams are formed adjacent the lower boundary of opening 37 in the form of the laterally extending support flanges 38 having shift lever supporting faces adapted to bear on the upper face of the bushing flange 28.

In Fig. 3 the rocker flanges 38 are deflected laterally outwardly from the depending side walls 36 of lever E and away from each other, such arrangement permitting these side walls to be fashioned smoothly for a freely fitting engagement with the sides 35 of head 29 as aforesaid and at the same time permitting the rod head 29 to be assembled with lever E by inserting head 29 directly into opening 37 between rockers 38. However, if desired, the rockers 38 may be deflected laterally inwardly toward each other as in the Fig. 9A or Fig. 11 embodiments. Rockers 38 are spaced from each other at opposite sides of axis X—X of rod D, the rockers extending in the general direction of the shift lever E so as to intersect a plane through axis X—X transversely to lever E.

The fulcrum point for lever E remains, during operation of the lever, substantially in a plane through axis X—X transverse to the lever. It is desirable to maintain the fulcrum point closely adjacent the rod axis X—X to minimize lateral loads on rod D and this has been accomplished in the accompanying embodiments of my invention.

I have provided means supported between the depending side walls of lever E and cooperating with the slotted formation of the lever head 29 for effecting lift of the rod D in response to lift of lever handle 34 and also for maintaining lever E positioned against undesired displacement in the direction of its length transversely to the axis X—X, this means cooperating with the flanges 38 and fulcrum bushing 26 to guide up and down shifting movements of lever E. In Fig. 3 this means comprises a plate 39 extending between the side walls of lever E and having a flanged head 40 seating externally on one side wall, a companion flanged head 41 seating on the opposite side wall and being secured to the plate 39 by fasteners 42 and 43.

Plate 39 extends through slot 30 which is generally triangular in shape having its apex of cylindrical contour at 44 centered about an axis 45 to rotatably fit the cylindrical end 46 of plate 39. The other end of the plate is likewise cylindrically formed at 47 about an axis 48 for engagement with the base 49 of the slot 30, this being of arcuate formation centered on axis 45.

Figures 6, 7, 10, 14, 15:
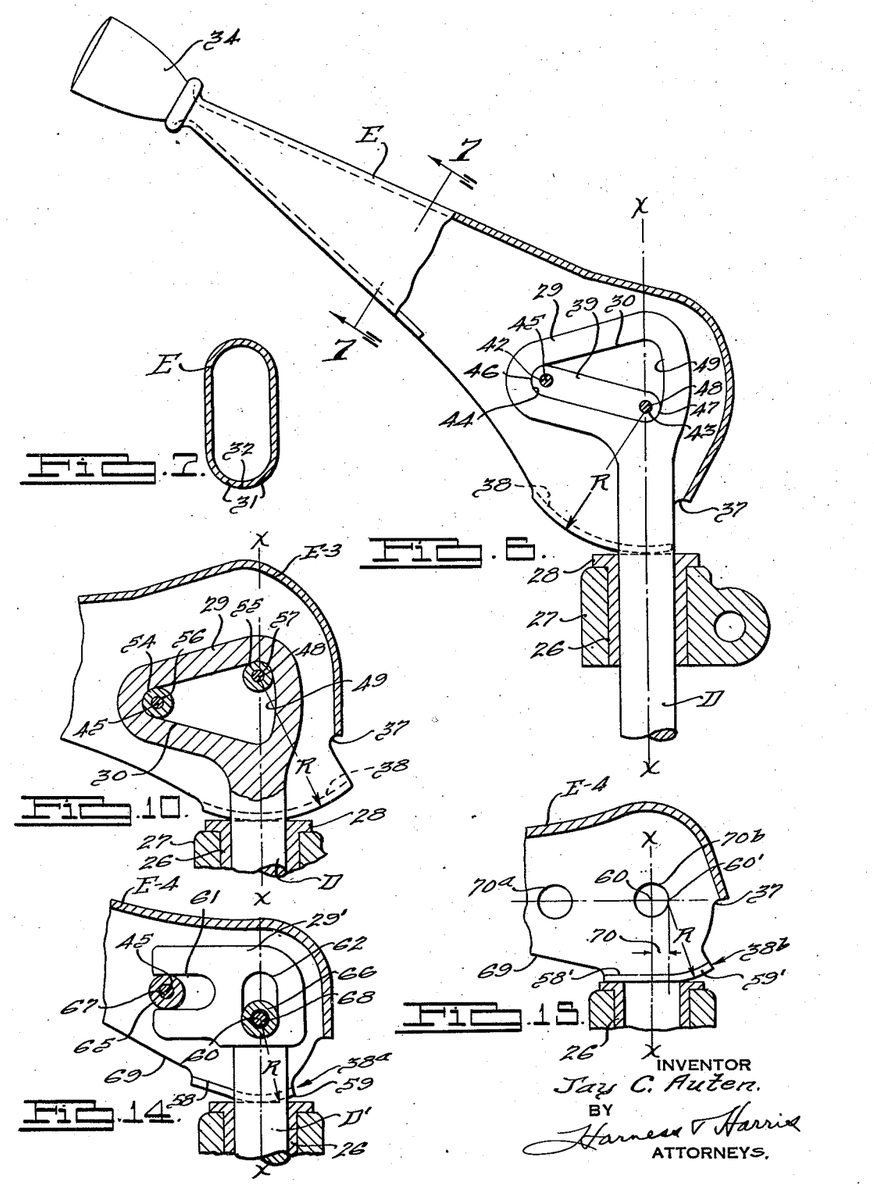
Fig. 6 is a sectional elevational view similar to the Fig. 3 assembly but illustrating the shift lever in its upwardly swung position.
Fig. 7 is a sectional elevational view through the shift lever as indicated by line 7—7 of Fig. 6.
Fig. 10 is a fragmentary view of a portion of the Fig. 3 assembly but illustrating a modified operating connection between the shift lever and the main control rod.
Fig. 14 is a fragmentary view of a portion of the Fig. 11 assembly but illustrating a modified operating connection between the shift lever and the main control rod.
Fig. 15 is a fragmentary view of a portion of a shift lever of the general type illustrated in Figs. 11 and 14 but illustrating a modified bearing flange.

In the Fig. 3 position of the parts with the lever E in its lowermost neutral position the upper face of plate 39 engages the upper wall or side of the triangular slot 30 and when the lever is fully swingingly raised to its Fig. 6 position then the lower face of plate 39 engages the lower wall or side of slot 30, the plane containing the parallel axes 45 and 48 thus sweeping through an angle approximately bisected by a plane normal to axis X—X and containing axis 48. Thus, by preference, the plate 39 is initially downwardly and outwardly inclined in the Fig. 6 position so that in lifting lever E the axis 45 moves substantially vertically in applying its lift to rod D with a minimum of side thrust on the rod D. However, if desired, the plate 39 may have an initial position horizontally or at some inclination other than that shown.

The flanges 38 are preferably of arcuate formation on a radius R about the axis 48 and this axis preferably intersects axis X—X or lies closely adjacent thereto in order to cause lever E to swing vertically about the axis of rod D without undue side thrust thereon and in order to maintain a fixed distance R between the lever axis 48 and the fulcrum surface at 28. With such an arrangement the axis 48 neither rises nor falls for vertical shifts of lever E and, therefore, neither gains nor loses effective lift on the rod D. Of course by curving flanges 38 about an axis either above or below that illustrated at 48, the effective lift of lever E will be either supplemented by increased lift or decreased lift as the case may be. Furthermore, flanges 38 could be of nonuniform curvature for camming lift if desired.

During upward swing of lever E from Fig. 3 to Fig. 6, the lever axis of rotation 48 has an imperceptible displacement laterally of axis X—X as the plate 39 moves perpendicular to axis X—X and the lever is free to so move by slight slip at the fulcrum support 28 as will presently be apparent.

In order to minimize friction between the fixed fulcrum bushing 26 and the lever flanges 38 slidably seated thereon and to provide for an easy noiseless shift of lever E both vertically and horizontally or laterally, I preferably form the bushing, or its lever supporting face, of some metal composition different from that of the lever flanges. Thus in Fig. 3 the bushing 26 is formed by molding and sintering powdered metal or metals of different melting points in a manner now well known in forming porous metal bearings of the self-lubricating type as, by way of example, set forth in patent to C. A. Tea 1,927,619, of September 19, 1933, and to W. G. Calkins et al., 1,927,627, of September 19, 1933. Lubricant may be provided in the form of graphite included in the metal mixture supplemented by or substituted by fluid lubricant absorbed by immersing the bushing in lubricating oil then to be exuded to the fulcrum surface of bushing flange 28.

Figure 2:
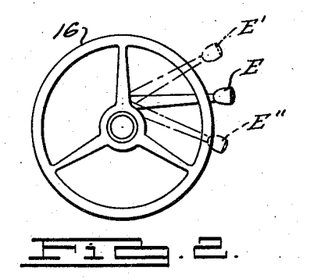
Fig. 2 is a plan view of the steering wheel and driver operable shift lever as viewed by the vehicle driver.

Following present known arrangements in remote gearshift mechanisms in general use, rod D is preferably biased downwardly at some convenient point or points in the connections of the operating system, usually within the transmission C. This serves to maintain lever E in its Fig. 3 neutral downwnardly swung position known as the high speed range ready to be rotated forwardly about axis X—X to the position E' in Fig. 2 for forward transmission drive setting or rearward to E'' for forward drive in high. Lever E is lifted in neutral and then moved forward about axis X—X for reverse, or rearward for forward drive in low, this latter position being omitted in some well-known shift arrangements especially where the manual shifts are supplemented by automatic shift functions in the transmision.

Because of the inclination of post 15 and rod D, and the mass of lever E, the lever when in the forward position E' has a tendency to work back to neutral especially when driving the car over rough roads. In order to offset this tendency and to also bias the lever E downwardly, I have provided a coil spring 50 (Figs. 8 and 9) having its upper end secured at 51 to rod D. The lower end of this spring is secured at 52 to bracket 24 and is displaced rotatably about axis X—X relative to the end at 51 in a direction tending to bias lever E forwardly from its neutral position, the displacement being such that with the lever shifted to the position E' the spring 50 will act to counterbalance and offset the tendency of the lever to jiggle out of the position E'. At the same time spring 50 exerts a constant downward pull on rod D so that lever E is maintained seated on bushing 26 and to maintain an anti-rattle connection between rod D and lever E.

With lever E in its Fig. 3 neutral position, rod D is biased downward causing head 29 to seat on the upper place of plate 39 thereby forcing the lever E to seat at its flanges 38 on the bushing flange 28 stationarily mounted on the post 15. Rotation of lever E either fore or aft will cause the lever and rod D to rotate as a unit about axis X—X, head 29 fitting the side walls of lever E. During this movement flanges 38 rotatably slidably bear on the bushing flange 28. The lubricant content of the bushing 26 insures the desired freedom of sliding contact at flanges 38 free from noise and undue wear.

When lever E is lifted from the Fig. 3 neutral position, preparatory for a rotational shift in the raised position, flanges 38 wipe across flange 28 at the bushing contact substantially in a plane transversely to the shift lever through axis X—X or closely adjacent thereto as in Fig. 3 while the plate portion at 46 lifts the head 29 until the parts are brought to the Fig. 6 position. During this lift, the lever E rotates about axis 48 in providing a mechanical advantage for lifting rod D in the ratio of the effective lengths of lever E and plate 39 from axis X—X. After the lever has been lifted then it is swung about axis X—X when in the Fig. 6 position. The wiping and rotating movements of flange 38 on flange 28 brings into action at different times the various portions of flanges 38 with the various portions of flange 28 so that there is no tendency to wear a groove in the fulcrum surface of flange 28.

In Fig. 9A I have illustrated a slightly modified bushing 26' which may be employed in lieu of the bushing 26 wherever illustrated in my drawings. This bushing is of steel or other metal faced at 53 with the aforesaid material forming bushing 26. The facing 53 is fused with the bushing flange 28' and provides all the aforesaid functions of flange 28. Inasmuch as the special bearing material is desired for co-action with flanged rockers 38' which are carried by the shift lever, it may be more economical in some instances to form the bushing as in Fig. 9A.

Furthermore, Fig. 9A illustrates a lever E—2 similar to lever E but differing therefrom in that its side walls, below the engagement with head 29, flare laterally outwardly and downwardly to accommodate forming the arcuate rocker flanges 38' directed inwardly toward each other instead of outwardly as in Fig. 5. Otherwise the parts may be as previously described. Obviously lever E—2 may, if desired, be substituted for lever E in Fig. 3 for engagement either with bushing 26 or 26', or with some other type of fulcrum.

Referring to Fig. 10, the parts are generally the same as in the Fig. 3 embodiment with the exception that the means for connecting the lever E—3 with the rod head 29 comprises cylindrical rollers 54 and 55 respectively rotatably mounted on the pins 56 and 57 supported across the lever side walls and fixed thereto. It will be apparent that the rollers 54, 55 perform the functions of the cylindrical end portions 46, 47 respectively of the plate 39 of Fig. 3 and, although in Fig. 3 the head 29 seats against the upper surface of plate 39 for the entire distance between the end portions 46, 47, in Fig. 10 the head 29 seats only at the rollers 54, 55. However, in Fig. 10 the rolling action thus provided between the slot 30 and rollers 54, 55 provides a minimum of friction thus facilitating ease of shift of lever E—3. Otherwise the Fig. 10 arrangement of parts functions just as described in connection with the Fig. 3 arrangement.

Figures 11, 12, 13:
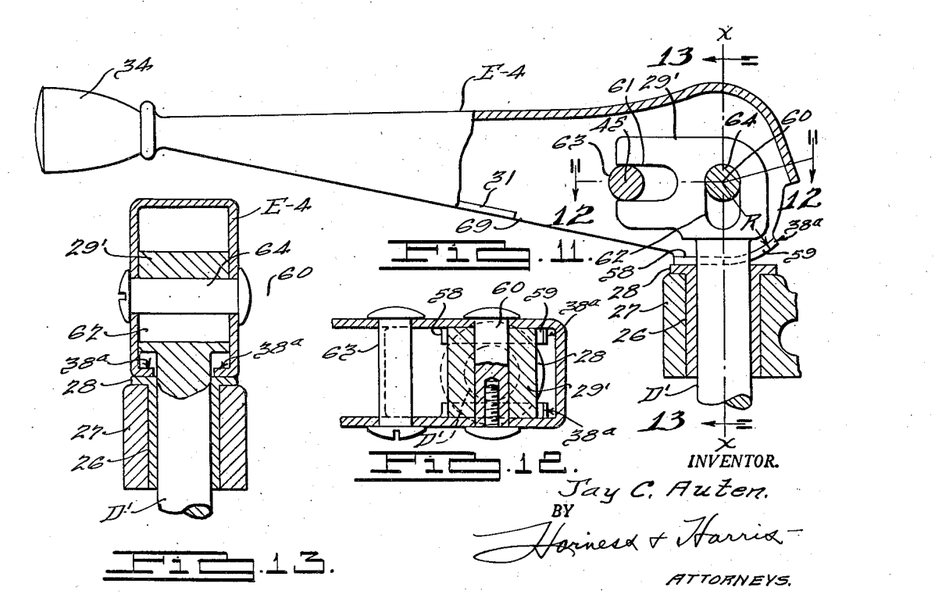
Fig. 11 is a view generally similar to Fig. 3 but illustrating a modification of my shift control mechanism.
Fig. 12 is a detail sectional plan view taken as indicated by line 12—12 of Fig. 11.
Fig. 13 is a sectional elevational view taken as indicated by line 13—13 of Fig. 11.

Referring now to Figs. 11 to 13, the lever E—4 is constructed similar to lever E except as follows. Lever E—4 has its parallel side walls spaced apart somewhat more than in Fig. 3 and the rocker flanges 38ª for the lever fulcruming action are deflected inwardly toward each other as in Fig. 9A but are now provided with flat or planar portions 58 parallel with and in face contact with the fulcrum bushing flange 28 to one side of a plane transverse to lever E—4 and containing the axis X—X of rod D' while to the other side of this plane the rockers have arcuate portions 59 formed about the lever axis 60 which corresponds generally with the aforesaid axis 48.

Rod D' now has an enlarged lever head 29' slotted at 61, 62. The slot 61 opens outwardly at the lever portion of head 29' and slidably receives the operating pin 63 anchored across the lever side walls. The slot 62 is vertically elongated to slidably receive a second similar pin 64 which serves to hold the lever E—4 in position lengthwise thereof and at the same time allows the head 29' to be displaced upwardly within the lever E—4 when the latter is lifted to effect the selecting axial shift of rod D'.

With the Fig. 11 arrangement, when lever E—4 is swung about axis X—X, the planar rocker portions 58 rotatably engage the upper face of flange 28 with a substantial flange area in bearing contact. Inasmuch as most of the lever shifting is done in the high range, without lifting the same, the Fig. 11 arrangement offers the advantage of a relatively large area of flange contact with the fulcrum bushing 26. When lever E—4 is lifted for the cross-over transmission selection, then flange portion 59 operates as in Fig. 3 to provide a sliding fulcrum support on the bushing, the pin 63 lifting the rod D' at the slotted lever portion of head 29'. When rod D' is thus lifted about axis 60, it is rotated by swinging lever E—4 about axis X—X.

In Fig. 14 I have illustrated a pair of rollers 65, 66 respectively mounted on the pins 67, 68 fixed to the side walls of lever E—4 for the same general advantages as set forth in connection with the rollers 54, 55 of Fig. 10. The Fig. 14 arrangement is otherwise the same as set forth in connection with Figs. 11 to 13, it being noted that in Fig. 14 the lever E—4 is illustrated in its raised position. In each of Figs. 11 and 14 the head 29' is assembled within the lever by inserting the head into the opening 69 provided between the bottom lever flanges 31 and the fulcruming rocker flanges 38ª. Once the head 29' is inserted into the space between the lever side walls then the lever is moved into its assembled position, the main rod portion accommodating positioning of the flanges 38ª to each side thereof. Then the pins 63, 64 may be installed as will be readily understood.

In Fig. 15, wherein the rod D' or D and the lever pins or rollers are omitted from the showing for clarity, the lever E—4 differs from that of Figs. 11 and 14 in that each of the rockers 38ᵇ now has its flat planar portions 58' extended an amount illustrated at 70 beyond the length of lever portions 58 to which they generally correspond in function, the arcuate portions 59' being correspondingly less than the corresponding arcuate portion 59 of Figs. 11 and 14. The arcuate rocker portions 59' are now centered on axis 60' which extends parallel to the axis 60 of vertical swing of the shift lever E—4, the axis 60' being offset by the amount indicated at 70 to one side of the rod axis X—X. Axes 60 and 60' thus extend transversely to the shift lever and axis X—X. This offset increases the lift of the shift lever by reducing the lever travel for a given lift of the main selector operator rod D or D' and also minimizes rattle at the lever lift pin 63 or roller 65 as will be more apparent in connection with the Fig. 17 embodiment. It will be understood that lever openings 70ª and 70ᵇ in each of the side walls of lever E—4 are adapted to receive the pins 63 and 64 respectively of the Fig. 11 embodiment for engaging the head 29' of rod D'. However, by making these openings 70ª and 70ᵇ of smaller diameter then they may readily accommodate the pins 56 and 57 for rollers 54 and 55 to actuate rod D of Fig. 10 or pins 67 and 68 for rollers 65 and 66 to actuate rod D' of Fig. 14 as will be readily understood.

Fig. 15 has the further advantage of providing additional flange area for the contact with bushing 26 when the lever is swung from neutral about axis X—X and, in addition, provides more overlap in the bushing surface portions which are subjected both to the rotational wiping action of the lever fulcruming flanges on the bushing and the sliding action of these flanges on the bushing incident to the lifting action of the lever, it being noted that the flange portions 58' are extended a distance 70 on that side of the aforesaid plane transverse to the lever E—4 containing axis X—X which side is common to rocker portions 59', the remainder of the lever portions 58' lying to the opposite side of such plane.

Referring to Fig. 16 I have illustrated a modified arrangement of means operating to bias rod D downwardly and also acting to prevent the shift lever from undesirably working back by gravity from its forwardly selected position of adjustment from neutral when vibrations or jiggle effects are experienced in driving the car. Furthermore, the Fig. 16 arrangement has the further advantage of being free from any tendency to bias the shift lever out of its rearwardly selected position of adjustment.

In Fig. 16 I have positioned a coil spring 71 below bracket 24 and having its lower end seated on the lower end of rod D as by engagement with the upper face of lever 25 which is fixed on this rod. Bracket 24 and lever 25 thus act as spring abutments. This spring 71 has a liberal clearance with shaft D such that it will not under any conditions engage the rod and tend to seize thereon and thus lead to spring failure. The upper end of the spring is seated on the shouldered lower face 72 of a washer 73 surrounding rod D with liberal clearance and having its upper flat face rotatably engaging the flat under face of the stationarily mounted bracket 24.

Washer 73 is preferably formed of a body of sintered powdered metal having a lubricant content as described in connection with bushing 26 and bushing facing 53. When the shift lever of any of my illustrated embodiments is shifted forwardly, when equipped with the Fig. 16 arrangement, then rotation of rod D causes spring 71 to torsionally deflect only a slight amount because spring 71 is allowed to bodily rotate. Tendency of the spring 71 to be torsionally stressed being prevented because the spring is free to rotate either at its contact with washer 73 or else by rotating with the washer, the latter slipping at its contact with bracket 24, depending on whether the friction is higher or lower at the bracket surface relative to the contact of the spring contact 72. In either event the friction at the washer surfaces is very small relative to the friction at the lever 25 seating spring 71. The lever will be maintained in its forwardly shifted position owing to the load of spring 71 resisting the gravity pull toward neutral on the main shift lever as well as the jiggle effect on the shift lever which tends to move the lever rearwardly from its forwardly shifted position.

Figures 8, 9:
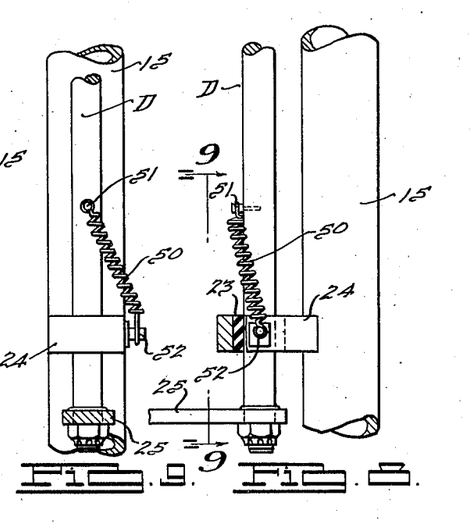
Fig. 8 is an enlarged elevational view illustrating the biasing means for the shift mechanism as viewed in Fig. 1.
Fig. 9 is a side elevational view of the Fig. 8 structure taken as indicated by line 9—9 of Fig. 8.
Figure 10:
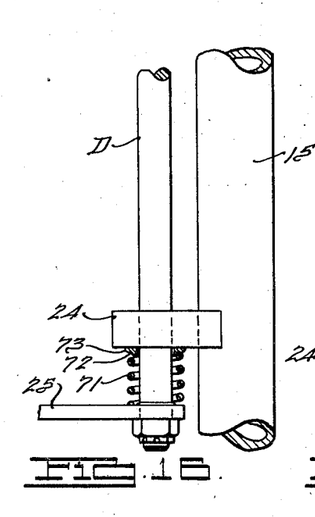

The Fig. 16 arrangement has the further advantage over the Fig. 8 arrangement of yieldingly maintaining the shift lever in its position of shift rearwardly from neutral. Although the gravity effect on the lever tends to maintain the shift lever in this position it is desirable in some transmission control systems to eliminate or minimize the Fig. 8 effect of spring 50 acting to bias the shift lever forwardly toward neutral from a position of shift rearwardly from neutral. The Fig. 16 arrangement serves this purpose in the same manner that it yieldingly resists undesired shift of the shift lever from the aforesaid position of shift forwardly from neutral. In other words the spring 71 in conjunction with washer 72 serves to maintain the shift lever in its positions of shift without introducing a biasing swing of the shift lever about the axis of the selector operator rod D or D'.

In Fig. 16 the spring 71 will remain seated at its lower end on lever 25 without slip at this point because no attempt is made to machine and polish or grind the lever spring seat and the inherent friction at this point is much greater than at washer 73. Furthermore, the torsion tending to be set up in spring 71, when rod D or D' is rotated, is relieved by the slip at washer 73 and this results in a smooth action by reason of the properties of washer 73 and cannot be felt by the operator at the lever handle 34. On the other hand if the spring 71 was allowed to slip at the lever 25, for example, then the rough action would be objectionable at the handle 34 and furthermore the spring 71 would build up undesired torsion before periodically slipping and would then only partially relieve the torsion leaving an undesired residue biasing the shift lever out of its positions of shift.

Figure 17:
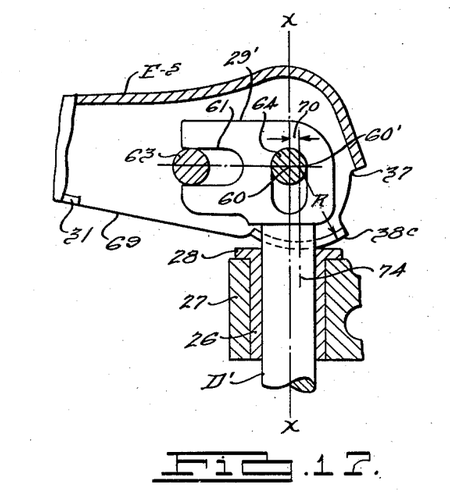
Fig. 17 is a view generally similar to Fig. 11 but illustrating a modified arrangement of lever fulcruming support.

Referring to Fig. 17 the lever E—5 differs from lever E—4 of Fig. 11 in that the fulcruming rockers 38c are arced about radius R centered at axis 60' which, as in Fig. 15, is offset from axis X—X of rod D' by an amount 70. The direction of this offset is preferably to one side of a plane transverse to the lever E—5 through axis X—X opposite that side where the lever handle 34 is located. In such an arrangement the downward bias of spring 50 or 71 on rod D' produces a downward force on lever E—5 at pin 64 along axis X—X. This results in an upward supporting force at bushing flange 29 along an axis 74 offset from axis X—X and extending parallel thereto through axis 60'. The resulting couple, which assists the gravity force on the lever, tends to bias the lever E—5 counterclockwise as viewed in Fig. 17 causing lever pin 63 to maintain contact with the slot 61 by reason of pin 63 acting downwardly on the lower prong of the lever projection of head 29'. In this manner rattles are prevented as all clearances are taken up and the provision of special anti-rattle washers or springs rendered unnecessary. Furthermore the offset of axis 60', about which rockers 38c are arced, operates when the lever is lifted to swing about axis 60 to increase the lever lift and reduce lever travel relative to the Fig. 11 arrangement for the same upward shift of rod D'.

Figure 18:
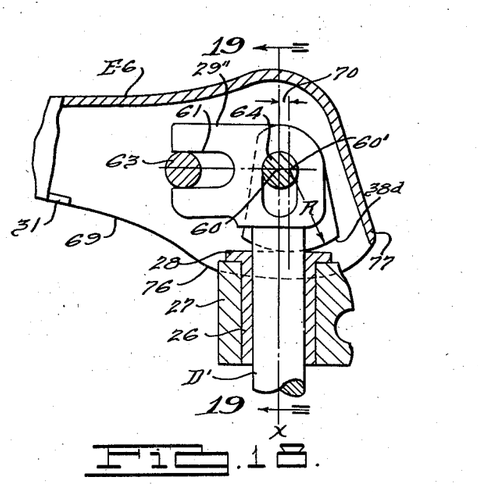
Fig. 18 is another view generally similar to Fig. 11 but illustrating a further modified construction of lever fulcruming support.
Figure 19:
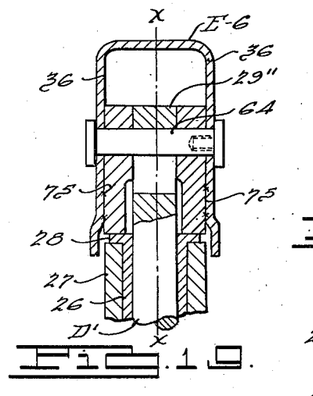
Fig. 19 is a sectional elevational view of the Fig. 18 control, the view being taken as indicated by line 19—19 of Fig. 18.

Referring now to Figs. 18 and 19, lever E—6 is generally similar to the Fig. 11 lever and carries fulcruming lever rockers as in the preceding embodiments. However, in Figs. 18 and 19 these rockers 38d are formed on elements 75 secured as by welding to the inner faces of side walls 36, the upper ends of these elements serving as spacers to receive the relatively narrow head 29'' therebetween and prevent undesired lateral movement of the lever relative to rod D'. Pin 64 is, as before, headed on its opposite ends to prevent spread of the lever side walls. The rockers 38d of elements 75 are arced on radius R just like the rockers 38c of Fig. 17 about centering axis 60' offset from axis X—X for the aforesaid reasons and advantages. Lever E—6 swings upwardly about axis 60 and laterally about axis X—X as aforesaid.

In Figs. 18 and 19 the lever side walls are skirted downwardly at 76 as is also the end wall at 77 to partially enclose the bushing 26 and flange 28 thus keeping dirt away from these parts, protecting the operating parts from accidental contact by the operator who may otherwise be injured, and to generally enhance the appearance of the control. The control mechanism otherwise functions as set forth in the previous embodiments.

Figure 20:
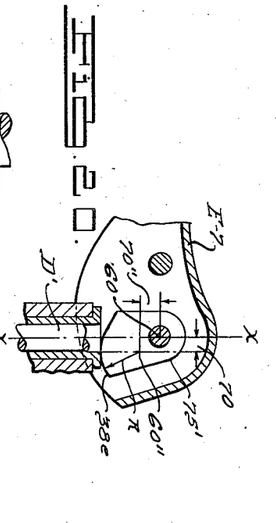
Fig. 20 is a view of a portion of the Fig. 18 shift lever modified to incorporate a variation in the rocker portion.

Referring to Fig. 20 I have illustrated a modified rocker formation which may be employed in any of the foregoing shift lever embodiments. For illustrative purposes I have shown only a portion of the Fig. 18 type of shift lever, it being understood that the Fig. 20 modification may be embodied in the Fig. 18 arrangement.

In Fig. 20 the shift lever E—7 differs from the lever E—6 in that the fulcruming rockers are shaped differently. These rockers 38e are, as in the previously described embodiments, carried rigidly by the shift lever by reason of their being formed on the spacer members 75' welded to the lever side walls in a manner similar to members 75 of Fig. 18. However, in Fig. 20 the rockers 38e are arced at radius R about an axis 60'' which extends transversely of and closely adjacent to the rod axis X—X and parallel to the axis 60 of upward swing of the shift lever E—7. This axis 60'' is furthermore offset downwardly an amount indicated at 70'' from a plane normal to axis X—X through the axis of swing 60. The arcuate formation of rockers 38e provides the same benefits in connection with the offset at 70 as have been heretofore set forth in connection with the offset 70 in Figs. 15, 17, and 18 for example. In addition, the offset 70'' of the rocker radius relative to axis 60 operates to negative the effect of the offset 70 which increases the lever lift and reduces the lever travel for a given rod lift. Obviously the amount of offset at 70 and 70'' may be varied as desired and it will be obvious that either or both of these offsets may be provided in connection with the rocker faces of any of the illustrated embodiments of my invention.

Figure 21:
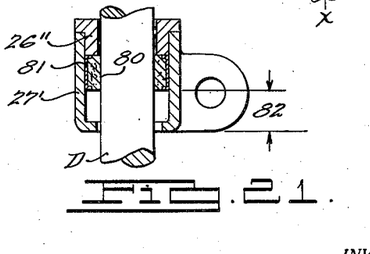
Fig. 21 is a detail sectional elevational view illustrating a modified bushing structure for the main control rod.
Figure 22:
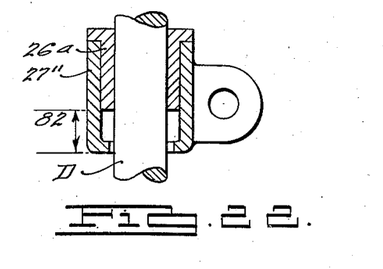
Fig. 22 is a view similar to Fig. 21 but illustrating a further modified bushing structure.

Referring to Figs. 21 and 22 I have illustrated modified forms of bracket mountings for the shift levers of any of the foregoing embodiments of my invention.

Figure 1:
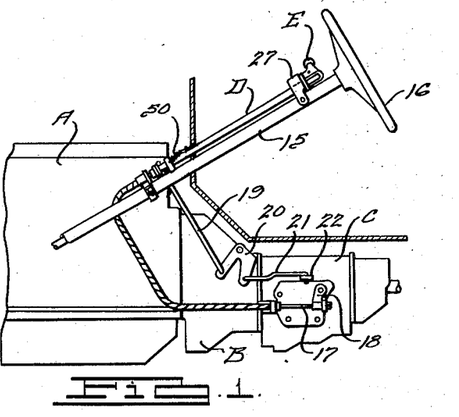
Fig. 1 is a side elevational view of a typical power plant and steering wheel installation for a motor vehicle showing my invention applied thereto.

In Fig. 21 the bracket 27' is adapted to be secured to the steering column as in Fig. 1. The rod D extends through the bracket opening with a sliding guide fit in a bushing 80 of yielding material carried in a steel backing 81 press fitted within the bracket 27'. Adjacent and above bushing 80 is a bushing 26'' of material similar to bushing 26 aforesaid. Bushing 26'' is flanged to overlie the upper face of the bracket and provide a fulcrum face for the shift lever of any of my embodiments, this bushing having a clearance with rod D. Bushing 26'' is press fitted in bracket 27'.

In Fig. 21 the bracket 27' extends a distance 82 below the bushing 80 equal to approximately the vertical movement of rod D such that the portion of the rod which slidably engages bushing 80 is not exposed to view below bracket 27. Thus rod D may be painted up to the bracket 27' and when rod D is lifted, the painted part will not engage bushing 80 as otherwise it might seize in the bushing and otherwise mar or injure the parts.

In Fig. 22 the same arrangement at 82 is provided in connection with bracket 27'' and the bottom face of the single bushing 26ª which is similar to the bushing 26 in composition, in fit with rod D, and in lever fulcruming function.

I claim:

1. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, means for mounting said rod on said steering column comprising a member fixed relative to the steering column and having an annular fulcrum surface surrounding said rod adjacent said lever opening, means connecting the upper end of said rod with said shift lever for transmitting vertical swinging movements of said shift lever to said rod so as to move said rod in the direction of its axis and for guiding said shift lever for rotational shift about said rod axis during said rotary shifting movements of said shift lever, said shift lever having a pair of rockers rigidly carried thereby in lever-fulcruming engagement with said annular surface, said rockers extending generally longitudinally of said shift lever along and adjacent opposite sides of said rod and each rocker having at least a portion thereof arced about an axis extending in a direction transverse to said rod axis, said mounting and connecting means cooperating with said rockers such that when said shift lever is rotatably shifted about said rod axis the said rockers rotatably wipe said annular friction surface and such that when said shift lever is swung vertically upwardly said rockers slidably wipe said annular friction surface and fulcrum said shift lever for effecting lift of said rod.

2. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, means for mounting said rod on said steering column comprising a member fixed relative to the steering column and having an annular fulcrum surface surrounding said rod adjacent said lever opening, means connecting the upper end of said rod with said shift lever for transmitting vertical swinging movements of said shift lever to said rod so as to move said rod in the direction of its axis and for guiding said shift lever for rotational shift about said rod axis during said rotary shifting movement of said shift lever, said shift lever having a pair of side walls, portions of which are disposed adjacent the offset lever portion of said rod and terminate downwardly in laterally extending flanges providing lever-fulcruming rockers engaging said annular surface, said rockers extending generally longitudinally of said shift lever along and adjacent opposite sides of said rod and each rocker having at least a portion thereof arced about an axis extending in a direction transverse to said rod axis, said mounting and connecting means cooperating with said rockers such that when said shift lever is rotatably shifted about said rod axis the said rockers rotatably wipe said annular friction surface and such that when said shift lever is swung vertically upwardly said rockers slidably wipe said annular friction surface and fulcrum said shift lever for effecting lift of said rod.

3. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having a driver operable end portion and an opposite hollow end portion formed with bounding side walls each having a fulcruming rocker carried thereby, said rockers extending generally longitudinally of said shift lever and being spaced from each other in a direction transversely of said shift lever, said rod extending upwardly through the space between said rockers and having the lever portion at its upper end disposed within said hollow portion of said shift lever, means operably connecting said offset end of said rod to said shift lever for effecting axial and rotating movements of said rod respectively in response to vertical swinging and lateral shifting movements of said shift lever, a fulcrum mounted on the steering column, and engaging with said rockers during said swinging and shifting movements of said shift lever.

4. In a control mechanism according to claim 3, said connecting means between said offset end of said rod and said shift lever being so constructed and arranged as to pivotally guide said shift lever for vertical swinging movement about an axis extending transversely to and approximately intersecting said rod axis, said rockers being so disposed as to intersect a plane extending transversely to said shift lever and containing said rod axis, said outer end portion of said lever being disposed to one side of said plane.

5. In a control mechanism according to claim 3, said connecting means between said offset end of said rod and said shift lever being so constructed and arranged as to pivotally guide said shift lever for vertical swinging movement about an axis extending transversely to and approximately intersecting said rod axis, said rockers being so disposed as to intersect a plane extending transversely to said shift lever and containing said rod axis, said outer end portion of said lever being disposed to one side of said plane, each of said rockers having a shift lever supporting face slidably engageable with said fulcrum and curving, prior to upward swinging movement of said shift lever, upwardly from the rocker engaged portions of said fulcrum and in a direction away from and to the side of said plane opposite to that aforesaid.

6. In a control mechanism according to claim 3, said connecting means between said offset end of said rod and said shift lever being so constructed and arranged as to pivotally guide said shift lever for vertical swinging movement about an axis extending transversely to and approximately intersecting said rod axis, said rockers being so disposed as to intersect a plane extending transversely to said shift lever and containing said rod axis, said outer end portion of said lever being disposed to one side of said plane, each of said rockers having a shift lever supporting face slidably engageable with said fulcrum and disposed, prior to upward swinging movement of said shift lever, to the side of said plane opposite to that aforesaid, said rocker faces being arced about an axis disposed substantially paralled to and substantially coincident with said axis of swinging movement of said shift lever.

7. In a control mechanism according to claim 3, said connecting means between said offset end of said rod and said shift lever being so constructed and arranged as to pivotally guide said shift lever for vertical swinging movement about an axis extending transversely to and approximately intersecting said rod axis, said rockers being so disposed as to intersect a plane extending transversely to said shift lever and containing said rod axis, said outer end portion of said lever being disposed to one side of said plane, each of said rockers having a shift lever supporting face slidably engageable with said fulcrum and disposed, prior to upward swinging movement of said shift lever, to the side of said plane opposite to that aforesaid, said rocker faces, prior to upward swinging movement of said shift lever, having an engagement with said fulcrum limited substantially to said plane.

8. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, said rod lever portion having a generally triangularly shaped opening formed therein and so arranged that its base extends in the general direction of said rod axis and its apex lies adjacent the offset end of said rod lever portion, and means carried by said shift lever and extending transversely of said hollow portion through said opening in engaging association with said base and apex portions of said opening for providing an operable connection between said rod and shift lever.

9. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, said rod lever portion having a generally triangularly shaped opening formed therein and so arranged that its base extends in the general direction of said rod axis and its apex lies adjacent the offset end of said rod lever portion, and a plate carried by said shift lever and extending transversely of said hollow portion through said opening for operably connecting said rod with said shift lever, the bounding wall of said opening at the apex portion thereof being curved and said plate having a curved end portion rockingly fitting in said curved apex wall portion.

10. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, said rod lever portion having a generally triangularly shaped opening formed therein and so arranged that its base extends in the general direction of said rod axis and its apex lies adjacent the offset end of said rod lever portion, and means carried by said shift lever and extending transversely of said hollow portion through said opening in engaging association with said base and apex portions of said opening for providing an operable connection between said rod and shift lever, the bounding wall of said opening at the apex portion thereof being curved and said connecting means having a portion thereof rotatably fitting in said curved apex wall portion.

11. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, said rod lever portion having a generally triangularly shaped opening formed therein and so arranged that it base extends in the general direction of said rod axis and its apex lies adjacent the offset end of said rod lever portion, and a plate carried by said shift lever and extending transversely of said hollow portion through said opening for operably connecting said rod with said shift lever, said plate being so disposed in relationship with said shift lever and said opening as to swing between positions adjacent the bounding walls of said triangular opening at the sides thereof when said shift lever is swung between its limits of movement in effecting reciprocation of said rod.

12. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, said rod lever portion having a generally triangularly shaped opened formed therein and so arranged that its base extends in the general direction of said rod axis and its apex lies adjacent the offset end of said rod lever portion, and means carried by said shift lever and extending transversely of said hollow portion through said opening in engaging association with said base and apex portions of said opening for providing an operable connection between said rod and shift lever, said connecting means comprising a pair of members spaced from each other and respectively engaging the apex and base bounding wall portions of said opening.

13. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, said rod lever portion being slotted to provide roller-engaged walls carried by said rod lever portion, and a pair of rollers carried by said shift lever and extending transversely of said hollow portion in engagement with said walls of said rod lever portion for providing an operable connection between said rod and shift lever.

14. In a steering column mounted control mechanism for selectively operating speed ratio controls of a motor vehicle transmission, a main rotatable and reciprocatory control rod having its axis parallel to said steering column and adapted for operative connection with the transmission, means for mounting said rod on said steering column comprising a member fixed relative to the steering column and having an annular fulcrum surface surrounding said rod, said rod having its upper end provided with an offset lever portion rigidly connected to said rod and extending in a direction perpendicular to said rod, a shift lever extending in a direction substantially parallel to said offset lever portion and provided with a rocker surface engaging said annular fulcrum surface, a connection between the middle portion of said shift lever and said offset lever portion permitting relative rotation in the plane of said shift lever and said rod, a second connection between said shift lever and said offset lever portion adapted to permit relative motion therebetween in the direction of the axis of said rod, said second connection being disposed in a plane perpendicular to said shift lever and containing the axis of said rod whereby rocking said shift lever on said fulcrum surface will cause axial movement of said rod and means connecting said shift lever and said offset lever portion to transmit the motion of rotation of said handle about the axis of said rod to said rod.

15. In a steering column mounted control mechanism for selectively operating speed ratio controls of a motor vehicle transmission, a main rotatable and reciprocatory control rod having its axis parallel to said steering column and adapted for operative connection with the transmission, means for mounting said rod on said steering column comprising a member fixed relative to the steering column and having an annular fulcrum surface surrounding said rod, said rod having its upper end provided with an offset lever portion rigidly connected to said rod and extending in a direction perpendicular to said rod, a shift lever extending in a direction substantially parallel to said offset lever portion and provided with a rocker surface engaging said annular fulcrum surface, a connection between the middle portion of said shift lever and said offset lever portion adapted to restrict said shift lever and said offset lever portion from relative motion in a direction parallel to the axis of said rod, a second connection between said shift lever and said offset lever portion adapted to permit relative motion therebetween in the direction of the axis of said rod, said second connection being disposed in a plane perpendicular to said shift lever and containing the axis of said rod whereby rocking said shift lever on said fulcrum surface will cause axial movement of said rod and means connecting said shift lever and said offset lever portion to transmit the motion of rotation of said handle about the axis of said rod to said rod.

16. In a steering column mounted control mechanism for selectively operating speed ratio controls of a motor vehicle transmission, a main rotatable and reciprocatory control rod having its axis parallel to said steering column and adapted for operative connection with the transmission, said rod having its upper end provided with an offset lever portion rigidly connected to said rod and extending in a direction substantially perpendicular to said rod, a shift lever extending in a direction substantially parallel to said offset lever portion, means connecting said lever portion to a mid portion of said shift lever, said means being adapted to permit rotation of said shift lever in a plane containing said rod axis relative to said offset lever portion, means to restrict said relative rotation to a predetermined arc, a fixed flat fulcrum surface perpendicular to the axis of said rod, a rocker surface carried by said shift lever at a portion offset from said connecting means and engaging said fulcrum surface whereby motion of said rocker surface in a direction parallel to the axis of said rod is prevented when said shift lever is rotated in the plane of the rod axis and the reciprocatory rod is moved in the direction of its axis and means connecting said shift lever and said offset lever portion to transmit the motion of rotation of said shift lever about the axis of said rod to said rod.

17. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever member having an outer end portion adapted to be grasped by the vehicle driver and a hollow inner end portion within which said offset lever portion is disposed thereby housing said lever portion within said hollow end portion and providing an operative connection between said shift lever member and said offset lever portion such that rotary shifting movements of said shift lever member about said rod axis cause said rod to rotate about said axis with said shift lever member, said hollow end portion of the shift lever member having an opening through which said rod extends, means for mounting said rod on said steering column comprising a second member fixed relative to the steering column, one of said members having a fulcrum surface, the other of said members having a rocker surface rigidly carried thereby in lever-fulcruming engagement with said fulcrum surface, said rocker surface extending generally longitudinally of said shift lever member, means connecting the upper end of said rod with said shift lever member for transmitting vertical swinging movements of said shift lever member to said rod so as to move said rod in the direction of its axis and for guiding said shift lever member for rotational shift about said rod axis during said rotary shifting movements of said shift lever member, said mounting and connecting means cooperating with said rocker surface such that when said shift lever member is rotatably shifted about said rod axis the said rocker surface and said fulcrum surface have relative wiping rotation such that when said shift lever member is swung vertically upwardly said fulcrum surface slidably wipes said fulcrum surface and fulcrums said shift lever for effecting lift of said rod.

JAY C. AUTEN.

REFERENCES CITED

The following references are of record in the file of this patent:

UNITED STATES PATENTS

| Number | Name | Date |
|---|---|---|
| 1,793,690 | Girardi | Feb. 24, 1931 |
| 2,100,642 | Geyer | Nov. 30, 1937 |
| 2,174,504 | Cole | Sept. 26, 1939 |
| 2,193,230 | Ferguson | Mar. 12, 1940 |
| 2,235,975 | Best | Mar. 25, 1941 |
| 2,303,787 | Burd | Dec. 1, 1942 |

Certificate of Correction

Patent No. 2,442,159.

May 25, 1948.

JAY C. AUTEN

It is hereby certified that error appears in the printed specification of the above numbered patent requiring correction as follows:

Column 6, line 6, for the word "place" read *face*;

and that the said Letters Patent should be read with this correction therein that the same may conform to the record of the case in the Patent Office.

Signed and sealed this 24th day of May, A. D. 1949.

[SEAL]

THOMAS F. MURPHY,
*Assistant Commissioner of Patents.*